Figure 1:
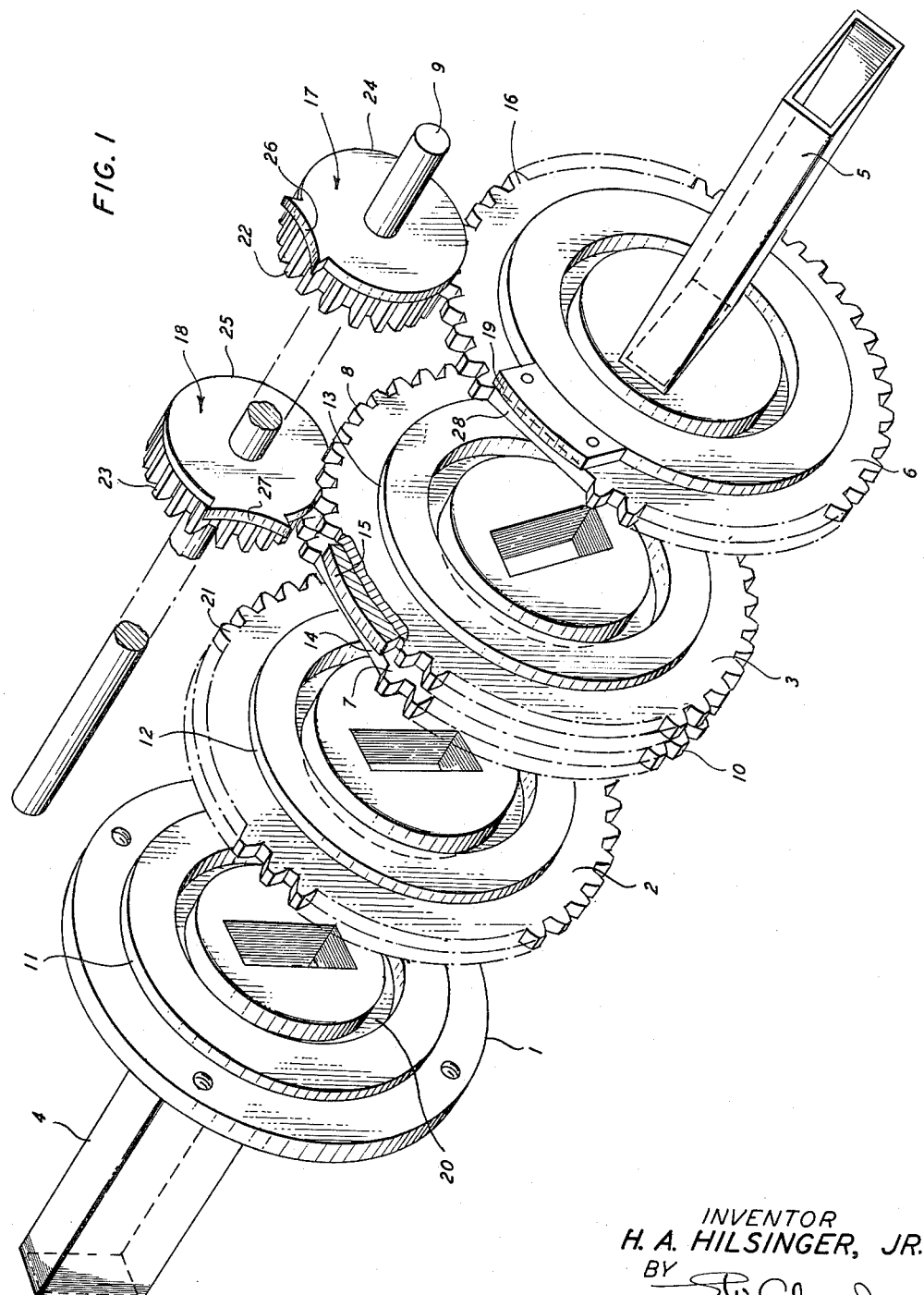

United States Patent Office 3,001,159
Patented Sept. 19, 1961

3,001,159
STEP TWIST WAVEGUIDE ROTARY JOINT
Harry A. Hilsinger, Jr., East Orange, N.J., assignor to Bell Telephone Laboratories, Incorporated, New York, N.Y., a corporation of New York
Filed Dec. 26, 1957, Ser. No. 705,448
2 Claims. (Cl. 333—98)

The present invention relates in general to waveguide joints and, in particular, to a step twist waveguide rotary joint.

Step twist waveguide rotary joints can be employed in microwave systems to interconnect two relatively rotatable rectangular waveguide sections. In the most usual application, such structures interconnect adjustable antennae and fixed transmitter or receiver equipment and provide a range of adjustment which is less than 360 degrees. A previous step twist rotary joint which has been used in such applications comprised a series of discs each having a rectangular opening which, when aligned, provide a continuous rectangular waveguide connection between two aligned relatively rotatable rectangular waveguide sections. Here the adjacent discs are interconnected by intermediate rings having pins on their opposite surfaces which cooperate with arcuate slots cut in the discs in such a way that rotation of one disc through an arc equal to the length of the slot picks up the interconnecting ring which after a further rotation equal to the length of a slot picks up the next disc and so forth. It can be recognized that upon reversal of the direction of rotation, the first disc to be displaced in the original rotation is also the first disc to be displaced in the return rotation and that each disc must rotate well beyond its respective original position to "unwind" all of the discs making up the joint. As a result, the standing wave ratio of such joints is satisfactory only for very restricted relative rotations of the two wave guides to be connected.

The principal object of the invention is to improve the standing wave ratio of step twist waveguide rotary joints.

According to one of the features of the present invention, the structure which interconnects the two relatively rotatable waveguides comprises a series of discs which are driven in such a manner that the magnitude of the angle of relative rotation between adjacent discs is the same for opposite directions of rotation.

According to another feature of the present invention the waveguide structure provided for interconnecting the two relatively rotatable waveguides operates in a manner such that the order of relative rotation of the discs comprising the structure is opposite for opposite directions of rotation when the discs are in any relative position other than the initial position where all the discs are aligned to form a continuous waveguide.

According to yet another feature of the invention the waveguide structure for interconnecting the two relatively rotatable waveguides operates in such a manner that the relative angle of displacement between the successive discs can be uniform or, if so chosen, tapered.

According to still another feature of the invention the structure for interconnecting the two relatively rotatable waveguides utilizes mechanical interconnections which are without lost motion which is large in relation to relative rotations.

Figure 2:
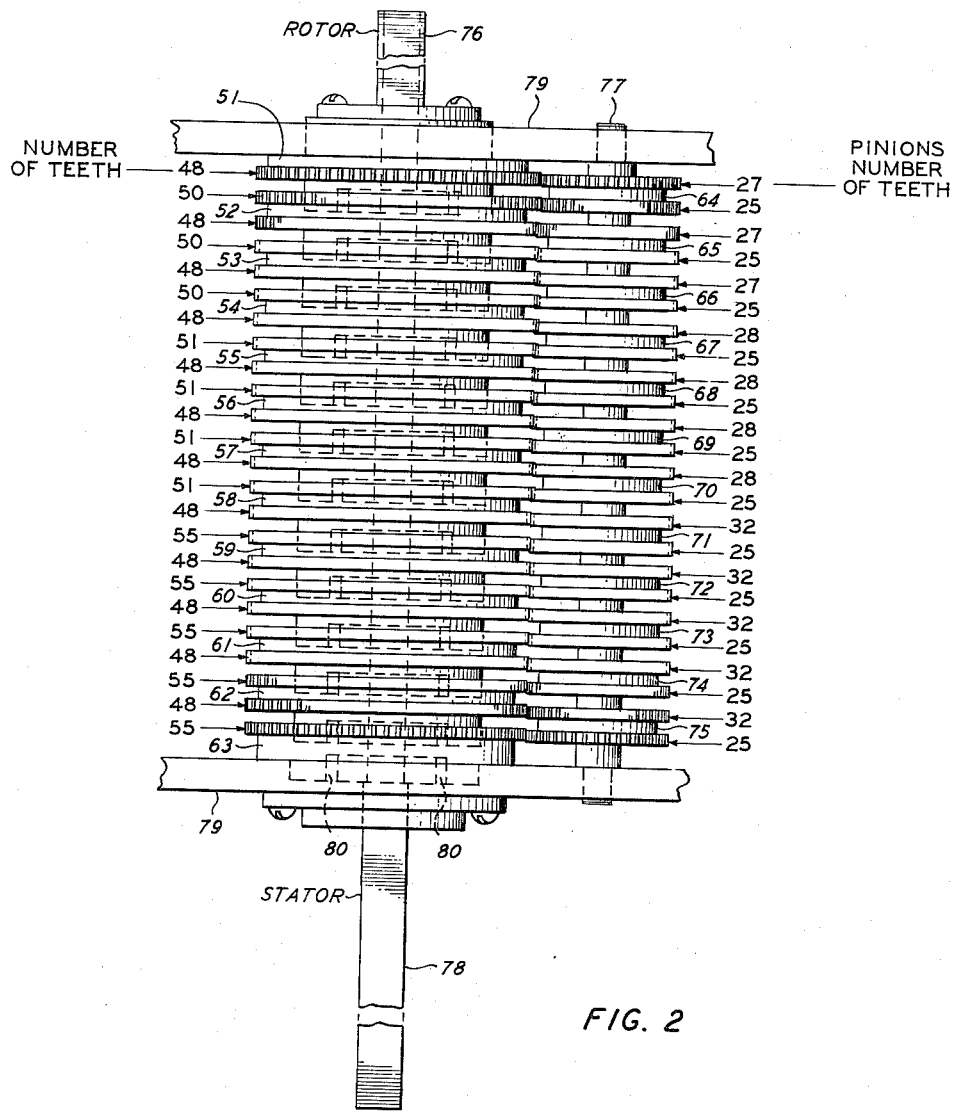

Other objects and advantages of the invention will be apparent from the following description based upon the accompanying drawings in which:

FIG. 1 is a partially exploded perspective view of one embodiment of the present invention; and FIG. 2 is a plan view of another embodiment of the invention.

As shown in FIG. 1, axially aligned waveguides 4 and 5 are joined by a rotatable or stepped twist joint arranged in accordance with the invention. Although shown partially exploded in the drawing, the joint may be thought of as comprising a series of discs, here shown as four, namely 1, 2, 3 and 6, which when stacked together and properly aligned form a continuous path between the two waveguides. Each of discs 1, 2, 3 and 6 is provided with a centrally located rectangular opening of the same dimensions as the interior of rectangular guides 4 and 5 which are to be connected. Disc 1 is attached permanently to waveguide 4 which may be considered to be fixed, and disc 6 is similarly attached to waveguide 5 which, for purposes of description, may be considered to be rotatable about its median axis with respect to waveguide 4. Means are provided for maintaining the stacked discs in axial alignment so that when properly oriented the rectangular openings therein will form an extension of waveguide 4. To this end, each of discs 1, 2 and 3 is provided with a shoulder 11, 12 and 13, respectively, on its front face (in FIG. 1) and each of discs 2, 3 and 6 is provided on its rear face with a mating concavity or socket into which the shoulder on the adjacent disc fits. This arrangement maintains the discs in axial alignment for relative rotation about an axis common to the four discs and to the median axes of the two waveguides to be joined.

The arrangement shown in FIG. 1 of the drawings has been simplified for purposes of the description and includes only four discs. As will appear hereinafter, this arrangement would provide only a rather limited rotation of waveguide 5 with respect to waveguide 4, and in a practical arrangement a much greater number of discs, depending upon the permissible relative rotations of adjacent discs, would be required. Positive drive mechanisms are provided for rotating the several discs relative to one another in such a way as to maintain the extent of relative rotation between two adjacent discs within predetermined limits. In the arrangement of FIG. 1, this drive takes the form of a series of Geneva mechanisms, parts of which are formed on the peripheries of the several discs and the remaining parts of which are journaled at appropriate locations on a countershaft 9 positioned parallel to the axis of the discs in such a way that the various parts of the drive mechanism may interact. Also in each of the discs there may be provided a choke such as concentric groove 20 cut in the front face of disc 1 to prevent leakage of radio frequency energy.

Considered in more detail, the periphery of disc 3 has cut therein a series of teeth and may be thought of as comprising a spur gear. A groove 7 is cut in the periphery of the disc and parallel to the plane thereof to divide the periphery into two sets of teeth, one set, 8, adjacent to the front face of the disc and the other set, 10, adjacent to the rear face. As shown in the drawings, the ring of teeth 8 adjacent to the front face of the disc is continuous and forms a spur gear, while the ring of teeth 10 adjacent the rear face is cut away at one section of the periphery to leave a gap 14 in which no teeth appear. At the same point in the periphery, a corresponding cam surface 15 is mounted or formed in the grooved portion of the disc and these two elements, the gap in the teeth of ring gear 10 and the cam surface 15 in the groove 7, cooperate with portions of the drive mechanism mounted on the countershaft 9 in a manner which will be discussed hereinafter.

Discs 1, 2 and 6 differ slightly from disc 3 and if the rotary joint is desired to be expanded it can be done by merely inserting more discs identical to disc 3. Disc 6 is the disc driven by the rotation of waveguide 5 and therefore there is no need for a set of gears on the front face such as 8 of disc 3. However, a set of gear teeth 16 similar to teeth 10 of disc 3 is provided, and also a cam surface 19 similar to cam surface 15. Disc 1 is attached to waveguide 4 and also does not rotate and therefore has no teeth cut in the periphery thereof, there simply being shoulder 11 and choke 20 which are identical to the shoulders and chokes on the remaining discs. Disc 2, being the last rotatable disc, does not require a set of teeth on its rear surface such as teeth 10 of disc 3 and is provided with only a front set 21.

Driveably interconnecting the discs is a series of pinions 10 which in this illustration comprises pinions 17 and 18. Each of pinions 17 and 18 is mounted on idler shaft 9 and has gear teeth 22 and 23, respectively, formed thereon of sufficient depth to engage both the rear ring of teeth on one waveguide disc and the front ring of teeth on the adjacent disc. For example, the teeth 23 of pinion 18 engage both gear teeth 10 of disc 3 and gear teeth 21 of disc 2. Also mounted on the idler shaft and fixed to each pinion is a cylindrical disc, 24 and 25, respectively, having a concave arcuate section 26 and 27, respectively, formed thereon. These arcuate sections are of the same radius of curvature as cam sections 15 and 19 of discs 3 and 6.

Assume now that waveguide 5 is to be rotated counterclockwise with respect to waveguide 4. We will therefore consider waveguide 4 fixed. FIG. 1 shows the device after waveguide 5 has been rotated counterclockwise so it must be imagined that in the initial starting position the discs 1, 2, 3 and 6 and the waveguides 4 and 5 are aligned so that there is no relative rotation between the two wave guides. In this position the cam surfaces 19 of disc 6 and 15 of disc 3 are located adjacent to and in the same plane as the concave arcuate sections 26 and 27 of the associated pinions 17 and 18. It should be noted that in this initial starting position the gear teeth 22 and 23 of pinions 17 and 18 are not in mesh with the gear teeth 16 and 10 of discs 6 and 3, respectively, because the latter gear teeth are cut away in these portions of the discs 6 and 3.

Let us now assume that the waveguide 5 and the disc 6 are rotated counterclockwise. Disc 6 and waveguide 5 rotate but pinion 17 does not and consequently discs 3 and 2 are not driven. This is because the teeth 16 on disc 6 which would normally drive the pinion 17 are cut away in the gap portion 28 of the disc 6. Therefore, disc 6 and waveguide 5 will rotate responsive to the applied torque and relative to the rest of the apparatus until one of the teeth 16 engages the gear teeth 22 of pinion 17. The angle of relative rotation when this occurs can be of any desired value. Also it should be noted that disc 3 cannot rotate during this time because of the interaction between arcuate section 26 of pinion 17 and the cam section 19 of disc 6 and because of the positive engagement of teeth 22 of pinion 17 and gear ring 8 on disc 3. The arc lengths of cut-away section 28 and cam section 19 of disc 6 and arcuate section 26 of pinion 17 are substantially the same.

Arcuate section 26 of pinion 17 and cam section 19 of disc 6 are aligned in the same plane and, having the same radius of curvature, fit snugly together in the initial starting position, but disc 6 can rotate since its radius of curvature at the contact area of cam section 19 and arcuate section 26 is that of cam section 19. On the other hand, the interaction of the opposing sections of the disc and pinion prevents the rotation of the pinion and thus of the remaining discs of the joint. Therefore, it can now be seen that during the arc length of travel disc 6 traverses while it is not driving pinion 17, pinion 17 is also locked in place due to the mechanism just explained. Therefore, the relative rotation is positive and predetermined.

The arc length of travel or relative rotation of disc 6 with respect to disc 3 before the latter begins to move may be chosen at will and the electrical properties of the system, the reflection that is tolerable, the number of discs provided and the total desired rotation will determine the rotation step taken with each disc.

As soon as a gear tooth in the gear ring 16 meshes with a tooth 22 of pinion 17, then disc 6 drives pinion 17. The teeth 22 are also in mesh with the teeth 8 of disc 3 and disc 3 is thus driven by disc 6 through pinion 17. The pinion 18 is now in the position that pinion 17 was in when the mechanism was actuated, and the process is repeated. Discs 6 and 3 although rotated from each other by a predetermined angle now begin to rotate together but relative to disc 2. Then after discs 6 and 3 have rotated a predetermined angle disc 2 begins to rotate with discs 6 and 3 and relative to waveguide 4 and its attached disc 1. As is readily apparent, any of a wide range of rotational steps can be taken with each disc and any number of discs may be used but the total rotation cannot be more than 360 degrees.

Now let us assume that we wish to return to the initial position where the angle of relative rotation between waveguides 4 and 5 is zero. As can be seen from FIG. 1, disc 6 which was the first to move has rotated more than any other disc. Disc 3 has rotated less than disc 6 but more than disc 2. Since all discs are positively geared together at this time, it is obvious that disc 2 will be the first to rotate back to the initial position. After disc 2 reaches the initial position disc 3 is no longer driving disc 2 through pinion 18 because pinion 18 is locked and the teeth 23 of pinion 18 are not in mesh with the teeth of ring 10 since a portion 14 of the teeth of ring 10 is cut away. However, disc 3 is being driven by disc 6 through pinion 17. As soon as disc 3 reaches its initial position disc 6 no longer drives pinion 17. Rotation of the joint clockwise and the return to the initial position should be readily understandable and no explanation thereof will be given.

FIG. 2 is a plan view of another embodiment of the invention wherein the several discs comprising the step twist rotary joint interconnecting the relatively rotatable waveguide sections 76 and 78 are driven by a mechanism which also acts to limit relative rotations of adjacent discs as did the drive shown in FIG. 1. Fig. 2 illustrates a twist joint comprising discs 51 to 63 and coacting drive mechanisms including pinions 64 to 75. Each disc except 51 and 63 has a pair of ring gears (ordinarily differing as to the number of teeth) mounted adjacent to the upper and lower faces of the disc. These ring gears may also be formed on the periphery of the disc and separated by a peripheral groove or formed in any manner convenient for manufacture. Similarly, each pinion is provided with a pair of peripheral gears which may be formed in the same way as those on the discs. The number of teeth on each face is indicated in FIG. 2 for both the discs and the pinions. Since the discs are mounted on the same axis and the pinions are all mounted on the same shaft 77 which is parallel to the disc axis the diameters of the gear rings on the several discs are not the same nor are the diameters of those on the pinions. Since discs 51 and 63 commence and terminate the gear train respectively, there is no necessity for gear teeth on the upper face of disc 51 or the lower face of disc 63. The discs 51 to 63 may be maintained in axial alignment by the shoulder-socket arrangement described with respect to FIG. 1. Choke flanges as shown dotted in disc 62, for example, and labeled 80 may also be formed in each disc to prevent leakage of radio frequency energy if desired. Also illustrated in FIG. 2 are rectangular waveguides or substantially rectangular waveguides 76 and 78 of equal inside dimensions. Waveguide 78 has been chosen to be the stator and is therefore secured to the housing 79 which is partially shown. Waveguide 76 is the rotor and passes through an opening in housing 79 where it is secured to disc 51 and is the actuating element, that is, the operative torque is applied to waveguide 76. The discs 51 to 63 have rectangular openings cut therein dimensionally equal to the inside dimensions of the wave guides just as the discs in FIG. 1.

For purposes of description a starting position is chosen such that there is complete alignment of the rectangular openings in all the discs and waveguides 76 and 78 to form a continuous rectangular waveguide. As waveguide 76 is rotated either clockwise or counterclockwise, all the discs move in the same direction, since the discs are all connected in a series gear train. However, due to the different diameters and numbers of teeth in the matching gears, not all of the discs move at the same rate. After waveguide 76 has been rotated 180 degrees, the discs 51 to 63 have rotated varying amounts as illustrated in the following table.

| Rotation from starting position when— | Relative rotation ratio between adjacent discs | Difference between adjacent discs, degrees |
|---|---|---|
| Disc No. 51=180° | 1/1.125 | 20 |
| Disc No. 52=160° | 1/1.125 | 17.8 |
| Disc No. 53=142.2° | 1/1.125 | 15.7 |
| Disc No. 54=126.5° | 1/1.19 | 20.2 |
| Disc No. 55=106.3° | 1/1.19 | 16.9 |
| Disc No. 56=89.4° | 1/1.19 | 14.4 |
| Disc No. 57=75° | 1/1.19 | 12 |
| Disc No. 58=63° | 1/1.466 | 20 |
| Disc No. 59=43° | 1/1.466 | 13.6 |
| Disc No. 60=29.4° | 1/1.466 | 9.4 |
| Disc No. 61=20° | 1/1.466 | 6.3 |
| Disc No. 62=13.7° | 1/1.466 | 3.3 |
| Disc No. 63=9.35° | | |

It is obvious that when the actuating waveguide 76 secured to disc 51 is in its initial position every disc in the series is also in its initial position. It can also be seen that in case waveguide 76 is rotated more than 360 degrees, the series gear train of discs 51 and 63 and pinions 64 to 75 can still follow waveguide 76.

It should be noted that the chosen gear ratios are not in any way restrictive of the invention since these ratios and the number of discs chosen were for a specific problem wherein the width and length of the disc-pinion housing was restricted by available space. As can be noticed by reference to the aforelisted table, there are three distinct relative rotation ratios employed between adjacent discs forming what can be termed a taper effect. If space is no problem, the angle of rotation between each disc can be as small as desired; also equal angular displacement between discs can be obtained. Further, the same diametral pitches can be used, but these and other embodiments of the invention are not illustrated since they are matters of calculation.

What is claimed is:

1. A waveguide structure comprising, a first and a second rectangular waveguide of the same cross sectional dimensions, a plurality of discs each having an opening of the same cross sectional dimensions as said waveguides and axially aligned with said waveguides, said discs being mounted adjacent to one another for relative rotation about the axis of said waveguides, one of said waveguides being secured to the disc nearest it for rotation therewith, and drive means actuated by the rotation of said nearest disc to rotate said nearest disc relative to the remainder of said discs through a predetermined angle, the adjacent disc to said nearest disc thereupon rotating with said nearest disc relative to the remainder of said discs for another predetermined angle and so on until each disc is rotated through a predetermined angle relative to the preceding disc, upon actuation by counter rotation of said nearest disc, said last disc to be rotated being the first disc to rotate back to the starting position, said next to last disc to be rotated being the second disc to rotate back to the starting position and so on in order until each disc is in its starting position where they form a continuous transmission path.

2. A waveguide rotary joint for coupling two sections of a waveguide which comprises a plurality of axially aligned discs, each of said discs in an initial position having an aperture aligned with the apertures in adjacent discs, and means for successively initiating each succeeding disc into rotation upon rotation of a first waveguide section in a first direction whereby the apertures are rotated into predetermined angular positions with respect to each other and for successively stopping in reverse order each succeeding disc from rotation upon rotation of the first waveguide section back to the initial position in a direction opposite to said first direction whereby the discs are returned to said initial position and the apertures are returned to alignment.

References Cited in the file of this patent

UNITED STATES PATENTS

| | | |
|---|---|---|
| 2,449,852 | Jones | Sept. 21, 1948 |
| 2,521,818 | Aron et al. | Sept. 12, 1950 |
| 2,529,381 | Frear | Nov. 7, 1950 |
| 2,947,955 | Bellamy et al. | Aug. 2, 1960 |